United States Patent
Matteucci et al.

(10) Patent No.: US 9,193,487 B2
(45) Date of Patent: Nov. 24, 2015

(54) SELF ASSEMBLING POLYMER MEMBRANES IN FOOD PACKAGING APPLICATION

(75) Inventors: Scott T. Matteucci, Midland, MI (US); Leonardo C. Lopez, Midland, MI (US); Shawn D. Feist, Midland, MI (US); Peter N. Nickias, Midland, MI (US); Shrikant N. Khot, Midland, MI (US)

(73) Assignee: Dow Global Technologies, LLC

( * ) Notice: Subject to any disclaimer, the term of this patent is extended or adjusted under 35 U.S.C. 154(b) by 723 days.

(21) Appl. No.: 13/577,603

(22) PCT Filed: Feb. 11, 2011

(86) PCT No.: PCT/US2011/024492
§ 371 (c)(1),
(2), (4) Date: Oct. 4, 2012

(87) PCT Pub. No.: WO2011/100524
PCT Pub. Date: Aug. 18, 2011

(65) Prior Publication Data
US 2013/0074451 A1 Mar. 28, 2013

Related U.S. Application Data

(60) Provisional application No. 61/304,125, filed on Feb. 12, 2010.

(51) Int. Cl.
| | |
|---|---|
| *B65B 41/00* | (2006.01) |
| *B65B 31/02* | (2006.01) |
| *A23L 3/3418* | (2006.01) |
| *B65D 65/40* | (2006.01) |
| *B65D 85/36* | (2006.01) |
| *B65D 85/74* | (2006.01) |
| *B65D 85/76* | (2006.01) |
| *C08G 69/40* | (2006.01) |
| *C08G 69/44* | (2006.01) |
| *C08J 5/18* | (2006.01) |
| *C08L 77/06* | (2006.01) |
| *C08L 77/12* | (2006.01) |
| *B65D 81/20* | (2006.01) |

(52) U.S. Cl.
CPC ............ *B65B 31/024* (2013.01); *A23L 3/3418* (2013.01); *B65B 41/00* (2013.01); *B65D 65/40* (2013.01); *B65D 85/36* (2013.01); *B65D 85/74* (2013.01); *B65D 85/76* (2013.01); *C08G 69/40* (2013.01); *C08G 69/44* (2013.01); *C08J 5/18* (2013.01); *C08L 77/06* (2013.01); *C08L 77/12* (2013.01); *B65D 81/2069* (2013.01); *C08J 2377/06* (2013.01); *C08J 2377/12* (2013.01)

(58) Field of Classification Search
CPC ...... B65B 41/00; A23L 3/3409; A23L 3/3418
USPC .......................................... 53/400, 433, 450
See application file for complete search history.

(56) References Cited

U.S. PATENT DOCUMENTS

| | | | | |
|---|---|---|---|---|
| 3,892,058 | A * | 7/1975 | Komatsu et al. | 53/425 |
| 5,632,133 | A * | 5/1997 | Wyslotsky | 53/433 |
| 6,020,047 | A * | 2/2000 | Everhart | 428/209 |
| 6,094,889 | A * | 8/2000 | Van Loon et al. | 53/450 |
| 7,707,803 | B2 * | 5/2010 | Mori et al. | 53/450 |
| 8,828,493 | B2 * | 9/2014 | Cheng et al. | 427/259 |
| 2005/0231855 | A1 * | 10/2005 | Tran | 360/324.1 |
| 2006/0230709 | A1 * | 10/2006 | Duffield et al. | 53/427 |
| 2010/0221462 | A1 * | 9/2010 | Forsyth | 428/34.1 |
| 2011/0185683 | A1 * | 8/2011 | Domenech et al. | 53/461 |
| 2011/0241245 | A1 * | 10/2011 | Hiltner et al. | 264/173.15 |
| 2014/0263178 | A1 * | 9/2014 | Sinton et al. | 216/56 |

FOREIGN PATENT DOCUMENTS

| | | |
|---|---|---|
| DE | 10018937 | 10/2001 |
| JP | H5-506466 | 9/1993 |
| WO | 91/13113 | 9/1991 |
| WO | WO 00/75220 | 12/2000 |
| WO | 2008/112834 | 9/2008 |
| WO | 2008/150970 | 12/2008 |

OTHER PUBLICATIONS

Google Search—"Self Assembly of Polymer Molecules", 2 pages; Jun. 29, 2015.*
Google Search—"Self Assembled Polymer Membranes", 2 pages; Jun. 29, 2015.*
International Search Report dated Jun. 14, 2011 for related PCT Application No. PCT/US2011/024492.
Japan Patent Office, Office Action in related Patent Application No. 2012-553023 (including English translation), dated Jun. 16, 2015.

* cited by examiner

*Primary Examiner* — Gloria R Weeks
(74) *Attorney, Agent, or Firm* — Akerman LLP; John J. Gresens

(57) ABSTRACT

A method of packaging a food product using a polymer membrane, the polymer being a self assembling polymeric material, and the method including a.) rendering the said polymer into a film; and b.) packaging a food product in an atmosphere with the said polymer film, wherein said film regulates the atmosphere in which the food product is packaged.

20 Claims, No Drawings

SELF ASSEMBLING POLYMER MEMBRANES IN FOOD PACKAGING APPLICATION

BENEFIT CLAIMS

This application is a U.S. National Stage of International Application No. PCT/US2011/024492 filed 11 Feb. 2011, which claims the priority benefit of 61/304,125 filed 11 Feb. 2010.

FIELD OF THE INVENTION

The invention relates generally to methods for maintaining a packaging atmosphere for storage of food products. More specifically, the invention relates to methods for the maintenance of a food packaging and storage atmosphere through use of polymeric membranes, films, foils, sheets, containers, tubes or patches comprising a macromolecularly self assembling polymer.

BACKGROUND OF THE INVENTION

Previous packaging technologies include D. R. Paul and R. Clarke; Modeling of modified atmosphere packaging based on designs with a membrane and perforations; Journal of Membrane Science, 2002, 208 p. 269-283. This article discloses the use of $CO_2/O_2$ selective polymers as a method for improving the ability of packaged produce to breathe. This paper discloses the concentrations of $CO_2/O_2$, and water vapor in the packaging environment that matches the respiration rate of various produce.

V. V. Pethe, et al; (Oxygen and Carbon Dioxide Permeability of EAA/PEO Blends and Microlayers; Journal of Applied Polymer Science, 2008, 110, p. 1411-1419); disclose the use of various polyethylene oxide) and ethylene acrylic acid copolymers as materials that are viable for produce packaging applications. The highest pure gas $CO_2/O_2$ selectivity reported was 16.8 for the pure PEO matrix, whereas the highest $CO_2$ permeability was 6.7 barrer.

Khemani et al., U.S. Pat. No. 7,297,394, Biodegradable Films and Sheets Suitable for use as Coatings, Wraps, and Packaging Materials discloses the use of a biodegradable polymer that has mechanical properties that are appropriate for food packaging. A water vapor transmission rate of at least about 80 g/m²/day is disclosed.

The control of atmospheric conditions inside produce packaging requires control of the transport rates of $CO_2$, $O_2$ and water vapor which is important in many packaging applications. Unfortunately, there are not many materials that satisfactorily demonstrate $CO_2$, $O_2$ and water permeabilities.

For instance, certain types of cut produce require dry environments to prevent decomposition. Other produce will become discolored if too much $CO_2$ or $O_2$ is present in the packaging environment.

Applications such as current produce packaging, the needs of the global produce shipping market are not being met. Fruits and vegetables continue to respire during transit, and they stay fresh longer if the atmospheric composition is tailored to their respiration rate. Current packaging materials do not have high $CO_2$ or $O_2$ permeabilities, and often suffocate the produce, which causes them to spoil quickly. It is desirable to design at least part of the packaging such that $CO_2$ can escape from the packaging and $O_2$ can enter around the produce.

As a result, there is a need for methods of maintaining the atmosphere in food packaging such that it extends product shelf life.

SUMMARY OF THE INVENTION

In accordance with one aspect of the invention, there is provided a method of packaging a food product using a polymer membrane, the polymer comprising a macromolecularly self assembling polymeric material. The method comprises rendering the polymer into a film and packaging the food product in an atmosphere with the polymer film wherein the film regulates the atmosphere in which the food product is packaged.

In accordance with a further aspect of the invention, the method of packaging the food product includes fabricating packaging material through coinjection processes in the form of films, foils, sheets, containers or tubes among other packaging configurations.

The invention is a method of maintaining a packaging atmosphere for the storage of food products. In this context, the atmosphere maintained is the environment within which the food product is stored including any packaging constructed from the polymer membrane of the invention.

Food products which may be subjected to the method of the invention include fruits and vegetables such as artichokes, apricots, banana, cranberry, eggplant, grapes, kiwifruit, leek, lettuce, mango, honeydew melons, mushrooms, nectarine, papaya, peach, pear, peas, bell pepper, pineapple, plum, radish, strawberries, and tomatoes among others including mixtures thereof.

Gas permeation through nonporous polymers is usually described using the so-called 3-step "solution-diffusion" model. According to this model, gas molecules at the upstream (i.e., high partial pressure) membrane surface partition into the upstream face of the polymer. The gas molecules diffuse through the polymer and desorb from the polymer surface exposed to low gas partial pressure. The second step in this process, diffusion through the polymer, is the rate limiting step.

The steady state permeability of a gas A, $P_A$, through a homogenous, isotropic flat sheet membrane of thickness/is defined as follows:

$$P_A \equiv \frac{N_A l}{(p_2 - p_1)} \quad (1)$$

where $N_A$ is the steady state gas flux through the film, and $p_2$ and $p_1$ are the feed and permeate partial pressures of gas A, respectively. Permeability is typically treated as an intrinsic property of a polymer penetrant system, and it is often reported in units of barrer, where:

1 barrer=$10^{-10}$ cm³(STP)cm/(cm² s(cm Hg))

To properly account for the effect of driving force on permeability, partial pressures in Eq. (1) are replaced by fugacities if the gases are not ideal. Generally, gases are considered to follow ideal gas behavior at pressures below 10 atm. Most permeability coefficients reported in the literature are calculated based on pressure or partial pressure rather than fugacity, so this report discusses permeability in terms of pressure.

At steady state, when Fick's first law of diffusion governs the gas transport and when the downstream pressure, $p_1$, is much lower than the upstream pressure, $p_2$, Eq. (1) may be expressed as follows:

$$P_A = D_A \times S_A \quad (2)$$

where $D_A$ is the effective concentration-averaged diffusion coefficient, and $S_A$ is the solubility coefficient at the upstream face of the membrane:

$$S_A = C_2/p_2 \quad (3)$$

where $C_2$ is the gas concentration in the polymer at the upstream film surface, and $p_2$ is the permeate partial pressure of gas A in the feed. Gas solubility in polymers often increases as some measure of gas condensability increases, such as critical temperature. Critical temperature, $T_c$, values for several gases of interest are presented below. $CO_2$ has, by far, the highest critical temperature among these gases. Since gas solubility in polymers scales exponentially with $T_c$, $CO_2$ will generally be much more soluble in polymers than these other gases, which increases the tendency of polymers to be more permeable to $CO_2$ than many other gases.

| Penetrant | Kinetic Diameter (A)15 | Critical Temperature (K)16 |
|---|---|---|
| $CO_2$ | 3.3 | 304.2 |
| $O_2$ | 3.46 | 154.6 |

Diffusion coefficients characterize the mobility of a penetrant molecule in a polymer, and they often correlate with penetrant size as measured by, for example, kinetic diameter, with smaller molecules having higher diffusion coefficients. The preceding table provides penetrant sizes, based on kinetic diameter, for some gases of interest in $CO_2$ separations. The $CO_2$ kinetic diameter is less than that of $O_2$ reflecting the oblong nature of $CO_2$. Like other anisotropically-shaped molecules, $CO_2$ is believed to execute diffusion steps predominantly in the direction of its narrowest cross-section. Consequently, $CO_2$ diffusion coefficients in polymers are usually higher than those of gases of considerably lower molecular weight (e.g., $O_2$). The ability of a polymer to separate two gases is often defined in terms of the ideal selectivity, A, B, which is the ratio of permeabilities of the two gases:

$$\alpha_{A/B} \equiv \frac{P_A}{P_B} \quad (4)$$

From Eq. (2), the ideal selectivity is the product of $D_A/D_B$, the diffusivity selectivity, and $S_A/S_B$, the solubility selectivity:

$$\alpha_{A/B} = \frac{D_A}{D_B} \times \frac{S_A}{S_B} \quad (5)$$

Diffusivity selectivity depends primarily on the relative size of penetrant molecules and the size-sieving ability of a polymer (i.e., the ability of a polymer to separate gases based on penetrant size), which depends strongly on polymer matrix free volume (and free volume distribution) as well as polymer chain rigidity. Solubility selectivity is influenced by the relative condensability of the penetrants and the relative affinity of the penetrants for the polymer matrix. As indicated earlier, penetrant condensability is often a dominant factor in determining solubility and, therefore, solubility selectivity. However, $CO_2$ is a polar penetrant and, as such, can have favorable interactions with polar groups in the polymer, thereby altering its solubility and solubility selectivity above and beyond penetrant condensability considerations alone.

DETAILED DESCRIPTION OF THE PREFERRED EMBODIMENTS

In accordance with the invention, there is provided a method of maintaining the atmosphere in food packaging such that it extends the food product shelf life. The method comprises packaging food in a polymeric membrane composed of a self assembling polymeric material. The method includes the steps of packaging a food product with a membrane, such that steady state $O_2$, $CO_2$, and/or water vapor transport maintains a packaging atmosphere that is conducive to the food product.

Molecular Self Assembling Material

As used herein a MSA material means an oligomer or polymer that effectively forms larger associated or assembled oligomers and/or high polymers through the physical intermolecular associations of chemical functional groups. Without wishing to be bound by theory, it is believed that the intermolecular associations do not increase the molecular weight (Mn-Number Average molecular weight) or chain length of the self-assembling material and covalent bonds between said materials do not form. This combining or assembling occurs spontaneously upon a triggering event such as cooling to form the larger associated or assembled oligomer or polymer structures. Examples of other triggering events are the shear-induced crystallizing of, and contacting a nucleating agent to, a molecularly self-assembling material. Accordingly, in preferred embodiments MSAs exhibit mechanical properties similar to some higher molecular weight synthetic polymers and viscosities like very low molecular weight compounds. However, it is possible to have a macromolecular self-assembling polymer that is of high molecular weight and of high viscosity and as such would be within scope of this invention. MSA organization (self-assembly) is caused by non-covalent bonding interactions, often directional, between molecular functional groups or moieties located on individual molecular (i.e., oligomer or polymer) repeat units (e.g., hydrogen-bonded arrays). Non-covalent bonding interactions include: electrostatic interactions (ion-ion, ion-dipole or dipole-dipole), coordinative metal-ligand bonding, hydrogen bonding, π-π-structure stacking interactions, donor-acceptor, and/or van der Waals forces and can occur intra- and intermolecularly to impart structural order.

One preferred mode of self-assembly is hydrogen-bonding and this non-covalent bonding interactions is defined by a mathematical "Association constant," K(assoc) constant describing the relative energetic interaction strength of a chemical complex or group of complexes having multiple hydrogen bonds. Such complexes give rise to the higher-ordered structures in a mass of MSA materials. A description of self assembling multiple H-bonding arrays can be found in "Supramolecular Polymers," Alberto Ciferri Ed., 2nd Edition, pages (pp) 157-158.

A "hydrogen bonding array" is a purposely synthesized set (or group) of chemical moieties (e.g., carbonyl, amine, amide, hydroxyl, etc.) covalently bonded on repeating structures or units to prepare a self assembling molecule so that the individual chemical moieties preferably form self assembling donor-acceptor pairs with other donors and acceptors on the same, or different, molecule. A "hydrogen bonded complex" is a chemical complex formed between hydrogen bonding arrays. Hydrogen bonded arrays can have association constants K (assoc) between $10^2$ and $10^9$ $M^{-1}$ (reciprocal molarities), generally greater than $10^3$ $M^{-1}$. In preferred embodiments, the arrays are chemically the same or different and form complexes.

Accordingly, the molecularly self-assembling materials (MSA) suitable for use in the invention include molecularly self-assembling polyesteramides, copolyesteramide, copolyetheramide, copolyetherester-amide, copolyetherester-amide, copolyetherester-urethane, copolyether-urethane, copolyester-urethane, copolyester-urea, copolyetherester-urea and their mixtures. Preferred MSA include copolyesteramide, copolyether-amide, copolyester-urethane, and copolyether-urethanes. The MSA preferably has number average molecular weights, $MW_n$ (interchangeably referred to as $M_n$) (as is preferably determined by NMR spectroscopy or optionally gel permeation chromatography (GPC)) of 200 grams per mole or more, more preferably at least about 3000 g/mol, and even more preferably at least about 5000 g/mol. The MSA preferably has $MW_n$ 1,000,000 g/mol or less, more preferably about 50,000 g/mol or less, yet more preferably about 25,000 g/mol or less, and even more preferably about 12,000 g/mol or less.

The MSA material preferably comprises molecularly self-assembling repeat units, more preferably comprising (multiple) hydrogen bonding arrays, wherein the arrays have an association constant K (assoc) preferably from $10^2$ to $10^9$ reciprocal molarity ($M^{-1}$) and still more preferably greater than $10^3$ $M^{-1}$; association of multiple-hydrogen-bonding arrays comprising donor-acceptor hydrogen bonding moieties is the preferred mode of self assembly. The multiple H-bonding arrays preferably comprise an average of 2 to 8, more preferably 4-6, and still more preferably at least 4 donor-acceptor hydrogen bonding moieties per molecularly self-assembling unit. Molecularly self-assembling units in preferred MSA materials include bis-amide groups, and bis-urethane group repeat units and their higher oligomers.

Preferred self-assembling units in the MSA material useful in the present invention are bis-amides, his-urethanes and bis-urea units or their higher oligomers. For convenience and unless stated otherwise, oligomers or polymers comprising the MSA materials may simply be referred to herein as polymers, which includes homopolymers and interpolymers such as co-polymers, terpolymers, etc.

In some embodiments, the MSA materials include "non-aromatic hydrocarbylene groups" and this term means specifically herein hydrocarbylene groups (a divalent radical formed by removing two hydrogen atoms from a hydrocarbon) not having or including any aromatic structures such as aromatic rings (e.g., phenyl) in the backbone of the oligomer or polymer repeating units. In some embodiments, non-aromatic hydrocarbylene groups are optionally substituted with various substituents, or functional groups, including but not limited to: halides, alkoxy groups, hydroxyl groups, thiol groups, ester groups, ketone groups, carboxylic acid groups, amines, and amides. A "non-aromatic heterohydrocarbylene" is a hydrocarbylene that includes at least one non-carbon atom (e.g., N, O, S, P or other heteroatom) in the backbone of the polymer or oligomer chain, and that does not have or include aromatic structures (e.g., aromatic rings) in the backbone of the polymer or oligomer chain.

In some embodiments, non-aromatic heterohydrocarbylene groups are optionally substituted with various substituents, or functional groups, including but not limited to: halides, alkoxy groups, hydroxyl groups, thiol groups, ester groups, ketone groups, carboxylic acid groups, amines, and amides. Heteroalkylene is an alkylene group having at least one non-carbon atom (e.g., N, O, S or other heteroatom) that, in some embodiments, is optionally substituted with various substituents, or functional groups, including but not limited to: halides, alkoxy groups, hydroxyl groups, thiol groups, ester groups, ketone groups, carboxylic acid groups, amines, and amides. For the purpose of this disclosure, a "cycloalkyl" group is a saturated carbocyclic radical having three to twelve carbon atoms, preferably three to seven. A "cycloalkylene" group is an unsaturated carbocyclic radical having three to twelve carbon atoms, preferably three to seven. Cycloalkyl and cycloalkylene groups independently are monocyclic or polycyclic fused systems as long as no aromatics are included. Examples of carbocylclic radicals include cyclopropyl, cyclobutyl, cyclopentyl, cyclohexyl and cycloheptyl.

In some embodiments, the groups herein are optionally substituted in one or more substitutable positions as would be known in the art. For example in some embodiments, cycloalkyl and cycloalkylene groups are optionally substituted with, among others, halides, alkoxy groups, hydroxyl groups, thiol groups, ester groups, ketone groups, carboxylic acid groups, amines, and amides. In some embodiments, cycloalkyl and cycloalkene groups are optionally incorporated into combinations with other groups to form additional substituent groups, for example: "-Alkylene-cycloalkylene-," "-alkylene-cycloalkylene-alkylene-," "-heteroalkylene-cycloalkylene-," and "-heteroalkylene-cycloalkyl-heteroalkylene" which refer to various non-limiting combinations of alkyl, heteroalkyl, and cycloalkyl. These combinations include groups such as oxydialkylenes (e.g., diethylene glycol), groups derived from branched diols such as neopentyl glycol or derived from cyclo-hydrocarbylene diols such as Dow Chemical's UNOXOL® isomer mixture of 1,3- and 1,4-cyclohexanedimethanol, and other non-limiting groups, such -methylcylohexyl-methyl-cyclohexyl-methyl-, and the like.

"Heterocycloalkyl" is one or more cyclic ring systems having 4 to 12 atoms and, containing carbon atoms and at least one and up to four heteroatoms selected from nitrogen, oxygen, or sulfur. Heterocycloalkyl includes fused ring structures. Preferred heterocyclic groups contain two ring nitrogen atoms, such as piperazinyl. In some embodiments, the heterocycloalkyl groups herein are optionally substituted in one or more substitutable positions. For example in some embodiments, heterocycloalkyl groups are optionally substituted with halides, alkoxy groups, hydroxyl groups, thiol groups, ester groups, ketone groups, carboxylic acid groups, amines, and amides.

Examples of MSA materials useful in the present invention are poly(ester-amides), poly(ether-amides), poly(ester-ureas), poly(ether-ureas), poly(ester-urethanes), and poly(ether-urethanes), and mixtures thereof that are described, with preparations thereof, in United States patent Number (USPN) U.S. Pat. No. 6,172,167; and applicant's co-pending PCT application numbers PCT/US2006/023450, which was renumbered as PCT/US2006/004005 and published under PCT International Patent Application Number (PCT-IPAPN) WO 2007/099397; PCT/US2006/035201, which published under PCT-IPAPN WO 2007/030791; PCT/US08/053917; PCT/US08/056754; and PCT/US08/065242. Preferred said MSA materials are described below.

In a set of preferred embodiments, the molecularly self-assembling material comprises ester repeat units of Formula I:

Formula I and at least one second repeat unit selected from the esteramide units of Formula II and III.

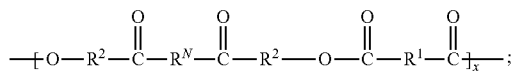
Formula II

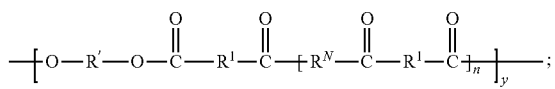
Formula III and the ester urethane units of Formula IV:

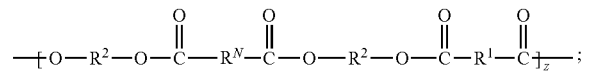
Formula IV wherein

R is at each occurrence, independently a $C_2$-$C_{20}$ non-aromatic hydrocarbylene groups, a $C_2$-$C_{20}$ non-aromatic heterohydrocarbylene groups, or a polyalkylene oxide group having a group molecular weight of from about 100 to about 15000 g/mol. In a preferred embodiments, the $C_2$-$C_{20}$ non-aromatic hydrocarbylene at each occurrence is independently specific groups: alkylene-, -cycloalkylene-, -alkylene-cycloalkylene-, -alkylene-cycloalkylene-alkylene-(including dimethylene cyclohexyl groups). Preferably, these aforementioned specific groups are from 2 to 12 carbon atoms, more preferably from 3 to 7 carbon atoms. The $C_2$-$C_{20}$ non-aromatic heterohydrocarbylene groups are at each occurrence, independently specifically groups, non-limiting examples including: -hetereoalkylene-, -heteroalkylene-cycloalkylene-, -cycloalkylene-heteroalkylene-, or -heteroalkylene-cycloalkylene-heteroalkylene-, each aforementioned specific group preferably comprising from 2 to 12 carbon atoms, more preferably from 3 to 7 carbon atoms. Preferred heteroalkylene groups include oxydialkylenes, for example diethylene glycol (—$CH_2CH_2OCH_2CH_2$—O—). When R is a polyalkylene oxide group it preferably is a polytetramethylene ether, polypropylene oxide, polyethylene oxide, or their combinations in random or block configuration wherein the molecular weight (Mn-average molecular weight, or conventional molecular weight) is preferably about 250 g/ml to 15000, g/mol, more preferably more than 280 g/mol, and still more preferably more than 500 g/mol, and is preferably less than 3000 g/mol; in some embodiments, mixed length alkylene oxides are included. Other preferred embodiments include species where R is the same $C_2$-$C_6$ alkylene group at each occurrence, and most preferably it is —$(CH_2)_4$—.

$R^1$ is at each occurrence, independently, a bond, or a $C_1$-$C_{20}$ non-aromatic hydrocarbylene group. In some preferred embodiments, $R^1$ is the same $C_1$-$C_6$ alkylene group at each occurrence, most preferably —$(CH_2)_4$—.

$R^2$ is at each occurrence, independently, a $C_1$-$C_{20}$ non-aromatic hydrocarbylene group. According to another embodiment, $R^2$ is the same at each occurrence, preferably $C_1$-$C_6$ alkylene, and even more preferably $R^2$ is —$(CH_2)_2$—, —$(CH_2)_3$—, —$(CH_2)_4$—, or —$(CH_2)_5$—.

$R^N$ is at each occurrence —$N(R^3)$—Ra—$N(R^3)$—, where $R^3$ is independently H or a $C_1$-$C_6$ alkyl, preferably $C_1$-$C_4$ alkyl, or $R^N$ is a $C_2$-$C_{20}$ heterocycloalkylene group containing the two nitrogen atoms, wherein each nitrogen atom is bonded to a carbonyl group according to Formula II or III above, w represents the ester mol fraction, and x, y, and z represent the amide or urethane mole fractions where w+x+y+z=1, 0<w<1, and at least one of x, y and z is greater than zero. n is at least 1 and has a mean value less than 2. Ra is a $C_2$-$C_{20}$ non-aromatic hydrocarbylene group, more preferably a $C_2$-$C_{12}$ alkylene: most preferred Ra groups are ethylene butylene, and hexylene —$(CH_2)_6$—. In some embodiments, $R^N$ is piperazin-1,4-diyl. According to another embodiment, both $R^3$ groups are hydrogen.

In an alternative embodiment, the MSA is a polymer of repeating units of either Formula II or Formula III, where R, $R^1$, $R^2$, $R^N$, and n are as defined above and x and y are mole fractions wherein x+y 1, and 0<x<1 and 0<y<1.

In certain embodiments comprising polyesteramides of Formula I and II, or Formula I, II, and III, particularly preferred materials are those wherein R is —$(C_2$-$C_6)$— alkylene, especially —$(CH_2)_4$—. Also preferred are materials wherein $R^1$ at each occurrence is the same and is $C_1$-$C_6$ alkylene, especially —$(CH_2)_4$—. Further preferred are materials wherein $R^2$ at each occurrence is the same and is —$(C_1$-$C_6$— alkylene, especially —$(CH_2)_5$— alkylene. The polyesteramide according to this embodiment preferably has a number average molecular weight (Mn) of at least about 4000, and no more than about 20,000. More preferably, the molecular weight is no more than about 12,000.

For convenience the repeating units for various embodiments are shown independently. The invention encompasses all possible distributions of the w, x, y, and z units in the copolymers, including randomly distributed w, x, y, and z units, alternatingly distributed w, x, y and z units, as well as partially, and block or segmented copolymers, the definition of these kinds of copolymers being used in the conventional manner as known in the art. Additionally, there are no particular limitations in the invention on the fraction of the various units, provided that the copolymer contains at least one w and at least one x, y, or z unit. In some embodiments, the mole fraction of w to (x+y+z) units is between about 0.1:0.9 and about 0.9:0.1. In some preferred embodiments, the copolymer comprises at least 15 mole percent w units, at least 25 mole percent w units, or at least 50 mole percent w units.

In some embodiments, the number average molecular weight ($M_n$) of the MSA material useful in the present invention is between about 1000 g/mol and about 1,000,000 g/mol, inclusive. In some embodiments, $M_n$ of the MSA material is between about 2,000 g/mol and about 50,000 g/mol, inclusive, preferably about 5,000 g/mol to about 25,000 g/mol.

The Method of Use

In accordance with various embodiments of the method of the invention, the polymer may be synthesized, placed as a membrane on a porous substrate, the substrate then being rendered into a patch, a film or a sheet that is used to package produce. In a further embodiment, the polymer synthesized can be laminated onto or in between the substrates being other plastics or cardboard as well as coinjected modified containers.

The invention is generally applicable to food packaging. Food packaging serves any number of purposes including physical protection, barrier protection, containment, and security among other functions. Any number of solid or liquid food products are capable of protection by the packaging of the invention including fruits and vegetables, fleshy foods such as fish, fowl, or meat, baked goods such as leavened and unleavened flour based foods, dairy products such as milk, yogurt, ice cream, butter, and cheeses. The processes and packaging of the invention may also be used with frozen and nonfrozen prepared foods.

Generally, the invention comprises the synthesis of polymers which are then processed by any number of means known to those of skill in the art to form a film or sheet. The film or sheet may then be processed to from any variety of rigid or nonrigid packaging stock which may be used to form foils, bags, pouches, boxes, cartons, trays, and wrapping among other types of packaging.

Processing to form this stock includes any variety methods and processes known to those of skill in the art including extrusion, molding, solvent and solution casting, rolling, calendaring as well as injection and coinjection molding. Representative molding processes including those disclosed in U.S. Pat. Nos. 4,717,324; 4,931,234; 7,704,433; 7,510,387 all of which are incorporated herein by reference. Representative injection and coinjection equipment includes that made by Arburg of Lossburg, Germany. Other machinery which has been found useful is that made available by EDI for the manufacture of multiple layer films and foils among other packaging stocks.

The resulting film or sheet may then be formed into a laminate, foil or any other rigid or non rigid stock as desired having the desired properties. In a preferred embodiment, the invention provides food packaging stock specific to the food to maximize shelf life. The packaging stock of the invention provides enhanced water vapor transmission rates (WVTR) with controlled gas transmission rates (OTR).

Film thickness may be varied as desired. Films may be produced ranging in thickness from about 20 microns to 500 microns. One preferred method of rendering films in accordance with the invention is coinjection wherein the polymer of the invention may be injected simultaneously with a substrate material or sandwiched between two substrate materials. Materials which may be used as substrates include any number of materials such as metal foils, cellulosic materials or polymeric materials. Cellulosic materials include rigid and nonrigid papers and cardboards. Metal films and foils may be comprise any metal or metal alloy useful in the given application such as aluminum, copper, tin or gold among others. Rigid and nonrigid polymeric substrates may also be used including those made from polyesters, polypropylene, polyolefins, polyamides, polystyrenes and the like. Here again, the thickness of the films and sheets may be modified to provide any variety of selectivities and permeabilities as well as varying the relative rigid/non rigid character of the packaging stock.

Initial atmospheric conditions in the food product packaging can be ambient atmospheric compositions, that is 21% $O_2$ and 79% $N_2$ with known trace components present on a dry basis. Water present anywhere from 0 to 100% relative humidity. Additionally, the food product may be wet, which may change the relative humidity between food product samples. The food product atmosphere may be a modified atmosphere such that the food product atmosphere is not at ambient atmosphere composition. For instance, inert gases, such as $N_2$, make up the entire composition of the initial food product atmosphere, or ethylene scavenging agents are present in the food product atmosphere.

The porous or perforated substrate is comprised of polyolefins, polyamides, polyesters, polystyrene, and mixtures thereof. The substrates may have a melting point of at least about 10° C. higher than the melting point of the MSA material. This substrate can be present to prevent contact between the MSA and a food product, or it can be used solely to provide structural stability to the MSA. The porous substrate must be sufficiently porous as to allow the MSA film to be the dominant layer in gas transport.

The polymer used in the method of the invention generally has a selectivity which varies depending upon constituent and flow rate. Use $CO_2/O_2$ selectivities should be above about 4.5 at $CO_2$ and $O_2$ flow rates that are tailored to the packaging area, produce type, and produce weight within the packaging such that a atmosphere is maintained in the package that extends produce shelf life. $CO_2$ permeability should be above 1 barrer, preferably above 2 barrer, and more preferably above 4 barrer. $O_2$ permeability should be above 0.3 barrer, preferably above 0.4 barrer, and more preferably above 0.5 barrer.

The polymer used in the method of the invention generally has a selectivity which varies depending upon constituent and flow rate. Use $H_2O/O_2$ selectivities should be above 10 at $H_2O$ and $O_2$ flow rates that are tailored to the packaging area, produce type, and produce weight within the packaging such that a atmosphere is maintained in the package that extends produce shelf life. $H_2O$ permeability should be above 500 barrer, preferably above 1000 barrer, and more preferably above 1500 barrer.

The method of the invention may be used to modify atmospheric composition as part of the packaging around any type of produce, with specific application to modifying the $CO_2$, $O_2$ and water content enclosed in the food packaging. Specific types of produce that may particularly benefit from this type of packaging include, but are not limited to: artichokes, apricots, banana, cranberry, eggplant, grapes, kiwifruit, leek, lettuce, mango, honeydew melons, mushrooms, nectarine, papaya, peach, pear, peas, bell pepper, pineapple, plum, radish, strawberries, and tomatoes among others including mixtures thereof. The atmosphere modifying layer can be applied as single or multilayer film enclosing the produce, where one or more layers of the films have perforations, or can be added as part of a patch which is attached to a container encompassing the produce, where the container can be a film or a rigid container.

WORKING EXAMPLES

The following Working Examples provide certain nonlimiting illustrative embodiments of various aspects of the invention.

Preparations

Preparation 1: Preparation of MSA material that is a polyesteramide (PEA) comprising 50 mole percent of ethylene-N,N'-dihydroxyhexanamide (C2C) monomer (the MSA material is generally designated as a PEA-C2C50%).

Step (a) Preparation of the diamide diol, ethylene-N,N'-dihydroxyhexanamide (C2C). A 10-liter (L) stainless steel reactor equipped with an agitator and a cooling water jacket is charged with ε-caprolactone (5.707 kilograms (kg), 50 moles) and purged with nitrogen. Under rapid stirring, ethylene diamine (EDA; 1.502 kg, 25 moles) is added at once. After an induction period a slow exothermic reaction starts. The reactor temperature gradually rises to 90° C. under maximum cooling applied. A white deposit forms and the reactor contents solidify, at which point stirring is stopped. The reactor contents are then cooled to 20° C. and are then allowed to rest for 15 hours. The reactor contents are then heated to 140° C. (at which temperature the solidified reactor contents melt), and heated then further to 160° C. under continued stirring for at least 2 hours. The resulting liquid product is then discharged from the reactor into a collecting tray. A nuclear magnetic resonance study of the resulting product shows that the molar concentration of C2C in the product exceeds 80 percent. The procedure is repeated four more times resulting in five product lots. The melting point of the product is determined to be 130-140° C. (main melting point) by differential scanning calorimetry (DSC) (peak maximum). The solid material is granulated and used without further purification.

Step (b): preparation of a MSA copolyesteramide with 50 mole percent amide content (PEA-C2C50%). Loading a reactor: A 100 L single-shaft Kneader-Devolatizer reactor equipped with a distillation column and a powerful vacuum pump system is nitrogen purged and heated to 80° C. (thermostat oil). Dimethyl adipate (DMA), 38.324 kilograms (kg) and granulated C2C monomer (31.724 kg, prepared as described above in Step (a)) are fed into the kneader. The slurry is stirred at 50 revolutions per minute (rpm). 1,4-butanediol (1,4-BD; 18.436 kg) is added to the slurry at a temperature of about 60° C. The reactor temperature is further increased to 145° C. to obtain a homogeneous solution.

Step (c): distilling methanol and transesterification. Still under nitrogen atmosphere, titanium(IV)tetrabutoxide catalyst, 153 grams (g) in 1.380 kg 1,4-BD is injected at a temperature of 145° C. in the reactor; methanol evolution starts. The temperature in reactor is slowly increased to 180° C. in 1.75 hours and is held for 45 additional minutes to complete the methanol distillation at ambient pressure. Methanol (12.664 kg) is collected.

Step (d): distilling 1,4-butanediol and polycondensation to give PEA-C2C50%. The reactor dome temperature is increased to 130° C. and the vacuum system activated stepwise to a reactor pressure of 7 millibars (mbar) in 1 hour. Temperature in the kneader/devolatizer reactor is kept at 180° C. Then the vacuum is increased to 0.7 mbar for 7 hours while the temperature is increased to 190° C. The reactor is kept for 3 additional hours at 191° C. and with vacuum ranging from 0.87 mbar to 0.75 mbar. At this point a sample of the reactor contents is taken (Sample Number 1); melt viscosities are 6575 miliPascals (mPa·s) at 180° C. and 5300 mPa·s at 190° C. The reaction is continued for another 1.5 hours until a sample (Sample Number 2) shows final melt viscosities are 8400 mPa·s at 180° C. and 6575 mPa·s at 190° C. Then the liquid Kneader/Devolatizer reactor contents are discharged at high temperatures of about 190° C. into collecting trays, the resulting MSA material is cooled to room temperature and grinded. Weight of final product PEA-C2C50% of Preparation 1 is 57.95 kg (87.8% yield). A sample (Sample Number 3) of the PEA-C2C50% of Preparation 1 has melt viscosities of 8625 mPa·s at 180° C. and 6725 mPa·s at 190° C. Viscosities are determined using a Brookfied DV-II+ Vicosimeter with spindle number 28 at 20 revolutions per minute (rpm).

Proton nuclear magnetic resonance spectroscopy (proton NMR or $^1$H-NMR) is used to determine monomer purity, copolymer composition, and copolymer number average molecular weight $M_n$ utilizing the $CH_2OH$ end groups. Proton NMR assignments are dependent on the specific structure being analyzed as well as the solvent, concentration, and temperature utilized for measurement. For ester amide monomers and co-polyesteramides, $D_4$-acetic acid is a convenient solvent and is the solvent used unless otherwise noted. For ester amide monomers of the type called DD that are methyl esters typical peak assignments are about 3.6 to 3.7 ppm for $C(=O)$—$OCH_3$; about 3.2 to 3.3 ppm for N—$CH_2$—; about 2.2 to 2.4 ppm for $C(=O)$—$CH_2$—; and about 1.2 to 1.7 ppm for C—$CH_2$—C. For co-polyesteramides that are based on DD with 1,4-butanediol, typical peak assignments are about 4.1 to 4.2 ppm for $C(=O)$—$OCH_2$—; about 3.2 to 3.4 ppm for N—$CH_2$—: about 2.2 to 2.5 ppm for $C(=O)$—$CH_2$—; about 1.2 to 1.8 ppm for C—$CH_2$—C, and about 3.6 to 3.75 —$CH_2OH$ end groups. Proton NMR determines that Sample Numbers 1 to 3 have $M_n$ of 6450 grams per mole (g/mol); 6900 g/mol; and 7200 g/mol, respectively.

Preparation 2: Preparation of MSA material that is a polyesteramide (PEA) comprising about 18 mole percent of ethylene-N,N'-dihydroxyhexanamide (C2C) monomer (the MSA material is generally designated as a PEA-C2C18%)

The following preparation is designed to give a PEA comprising 18 mol % of the C2C monomer. Into a 1-neck 500 mL round bottom flask is loaded titanium (IV) butoxide (0.31 g, 0.91 mmol), N,N'-1,2-ethanediyl-bis[6-hydroxyhexanamide] (C2C, 30.80 g, 0.1068 mol), dimethyl adipate (103.37 g, 0.5934 mol), and 1,4-butanediol (97.33 g, 1.080 mol). A stir-shaft and blade are inserted into the flask along with a modified Claisen adaptor with Vigreux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Torr (60 kiloPascals (kPa)); 5 minutes, 100 Torr; 5 minutes, 50 Torr; 5 minutes, 40 Torr; 10 minutes, 30 Torr; 10 minutes, 20 Torr; 1.5 hours, 10 Torr. Apparatus is placed under nitrogen, receiver changed, and placed under vacuum ranging over about 0.36 Torr to 0.46 Torr with the following schedule: 2 hours, 175° C.; 2 hours, to/at 190° C., and 3 hours to/at 210° C. Inherent viscosity=0.32 dL/g (methanol:chloroform (1:1 w/w), 30.0° C., 0.5 g/dL) to give the PEA-C2C18% of Preparation 2. By proton NMR in d-4-acetic acid, Mn from end groups of the PEA-C2C18% of Preparation 2 is 11,700 g/mol. The PEA-C2C18% of Preparation 2 contains 17.3 mole % of polymer repeat units containing C2C. Proton NMR determines that Sample Numbers 1 to 3 have $M_n$ of 6450 grams per mole (g/mol); 6900 g/mol; and 7200 g/mol, respectively.

Working Example 1

Prior to molding, all polymer and composite samples were allowed to dry overnight (at least 16 hours) at 65° C. in at approximately 36 cmHg. Samples were compression molded into a 10 cm×10 cm×0.05 cm (4"×4"×0.02") plaque and 5 cm×1.25 cm×0.32 cm (2"×0.5"×0.125") bars using a Tetrahedron MPT-14 press. The molding parameters for PEA C2C-50% and PEA C2C-18% based materials are listed in Tables 1 and 2, respectively.

TABLE 1

Compression molding parameters for PEA C2C-50% based composites.

| Step | Temperature, °C. | Load, kg (klb) | Load ramp rate, kg/min (klb/min) | Time, min |
|---|---|---|---|---|
| 1 | 140 | 608 (1.5) | 317 × 10³ (1200) | 5 |
| 2 | 140 | 4536 (10) | 317 × 10³ (1200) | 4 |
| 3 | 140 | 18143 (40) | 317 × 10³ (1200) | 3 |
| 4 | 37.8 | 450 (1) | 317 × 10³ (1200) | 5 |
| 5 | End | | | |

TABLE 2

Compression molding parameters for PEA C2C-18% based composites.

| Step | Temperature, °C. | Load, kg (klb) | Load ramp rate, kg/min (klb/min) | Time, min |
|---|---|---|---|---|
| 1 | 93 | 2268 (5) | 317 × 103 (1200) | 5 |
| 2 | 93 | 4536 (10) | 317 × 103 (1200) | 10 |
| 3 | 93 | 2268 (5) | 317 × 103 (1200) | 5 |
| 4 | 24 | 450 (1) | 317 × 103 (1200) | 5 |
| 5 | End | | | |

Apparatus: Obtain a gas permeation cell (Stainless Steel In-Line Filter Holder, 47 millimeters (mm), catalog number XX45 047 00 from Millipore Corporation). The gas permeation cell comprises a horizontal metal mesh support and a spaced-apart inlet and outlet respectively above and below the metal mesh support. The gas permeation cell together with a plaque being disposed on the metal mesh support, defines an upstream volume and a downstream volume. The inlet is in sequential fluid communication with the upstream volume, entrance face of the plaque, exit face of the plaque, downstream volume, and outlet. Also obtain a constant-volume variable-pressure pure gas permeation apparatus is similar to that described in reference FIG. 7.109 of Wiederhorn, S., et al., Mechanical Properties in *Springer-Handbook of Materials Measurement Methods*; Czichos, H., Smith, L. E., Saito, T., Eds.; Springer: Berlin, 2005; pages 371-397.

All samples were exposed to vacuum for at least 16 hours at the test temperature prior to running the permeation experiment. After exposure to vacuum, the leak rate was determined by closing both the upstream and downstream volumes to vacuum and feed gases. The rate of pressure increase was determined over a period of 5 minutes after the cell had been isolated for at least one hour. Acceptable leak rates were approximately $2 \times 10^{-5}$ torr/s or below. After an acceptable leak rate had been obtained, samples were exposed to $CO_2$ at 15 psig until the rate of pressure increase had reached steady state (i.e., less than 3% change in pressure increase over a period of at least 30 minutes). Samples were also tested at 45 psig upstream pressure for steady state $CO_2$ permeation.

$O_2$ transport across pure polymer and nanocomposite samples were conducted on a Mocon Ox-Tran® 2/21. Samples were 10 cm×10 cm×0.05 cm (4"×4"×0.02") plaques. The temperature was set to 23° C. The barometric pressure was ~750 mmHg, and the relative humidity for both the permeant and the carrier was ~50%.

Water vapor transport characterization was conducted using a Mocon Permatran-W® 700 for. Experiments were conducted at ~38° C., 760 mmHg barometric pressure, and 100% relative humidity.

Table 3 shows the $CO_2$, $O_2$ and water permeabilities for PEA C2C-50% and C2C-18% at 23° C. and a feed pressure of 15 psig. $CO_2/O_2$ ideal gas selectivity is presented in Table 4.

TABLE 3

Pure gas permeability at 23° C. and a feed pressure of 15 psig

| Polymer | $CO_2$ Permeability, barrer | $O_2$ permeability, barrer | Water permeability, barrer |
|---|---|---|---|
| PEA C2C-18% | 18.4 | 2.83 | 2770 |
| PEA C2C-50% | 4.0 | 0.75 | 1780 |

TABLE 4

Ideal gas $CO_2/O_2$ selectivity at 23° C.

| Polymer | $CO_2/O_2$ selectivity |
|---|---|
| PEA C2C-18% | 7.5 |
| PEA C2C-50% | 4.5 |

Working Example 2

The sample is prepared by compression molding taking a polypropylene non woven and impregnating it with MSA PEA C2C-50% and 50% (by weight) bentonite compound (Elementis Specialities, Bentone® 105 is made using a Polylab twinscrew extruder. A Lyssy 80-5000 is used to assess water vapor transmission rate (WTVR) with a standard of TAPPI 523-OM (equivalent to ASTM E96 and E372) with ambient conditions of 90% relative humidity and 38° C. The equipment used to measure OTR is a Mocon Co. model 2/21, and the norm is ASTM D3985 at 75% relative humidity and 23° C.
SAMPLE 2A PP nonwoven PEA C2C 50% with bentonite
SAMPLE 2B PP nonwoven PEA C2C 50% without bentonite
SAMPLE 2C PP nonwoven with HDPE HD40055E (High Density Polyethylene)
SAMPLE 2D HDPE HD40055E (High Density Polyethylene)

TABLE 5

WVTR and OTR Data

| | WTVR (g/sqm · day) | OTR (CC/m² · day) |
|---|---|---|
| SAMPLE 2A | 20,324 | — |
| SAMPLE 2B | 109,386 | 166.2594 (and 200 µm) |
| SAMPLE 2C | 0.170 | 126.8455 (and 250 µm) |
| SAMPLE 2D | — | 142.9849 (and 210 µm) |

While the invention has been described above according to its preferred embodiments of the present invention and examples of steps and elements thereof, it may be modified within the spirit and scope of this disclosure. This application is therefore intended to cover any variations, uses, or adaptations of the instant invention using the general principles disclosed herein. Further, this application is intended to cover such departures from the present disclosure as come within the known or customary practice in the art to which this invention pertains and which fall within the limits of the following claims.

The claimed invention is:

1. A method of packaging a food product using a polymer film, wherein said polymer film comprises a macromolecularly self assembling polymeric material, said method comprising the steps of:

a.) rendering said polymeric material into said polymer film; and
b.) packaging said food product in an atmosphere with said polymer film,
wherein said film regulates the atmosphere in which said food product is packaged.

2. The method of claim 1 wherein said polymer film is rendered by lamination.

3. The method of claim 1, wherein said polymer film is coinjected with a substrate.

4. The method of claim 1, wherein said polymer film is rendered between two substrates by coinjection.

5. The method of claim 3 or 4, wherein said substrate is selected from the group consisting of a metal or metal alloy, a polymeric material, a cellulose, or combinations thereof.

6. The method of claim 1, wherein said polymer film regulates carbon dioxide in said food product atmosphere.

7. The method of claim 1, wherein said polymer film regulates $O_2$ in said food product atmosphere.

8. The method of claim 1, wherein said polymer film regulates water and water vapor in said food product atmosphere.

9. The method of claim 1, wherein said polymer film has a $CO_2/O_2$ selectivity above 4.5.

10. The method of claim 1, wherein said polymer film has a water vapor/$O_2$ selectivity above 10.

11. The method of claim 1, wherein said macromolecularly self-assembling material is selected from the group consisting of a polyester-amide, polyether-amide, polyester-urethane, polyether-urethane, polyether-urea, polyester-urea, or a mixture thereof.

12. The method of claim 5, wherein said substrate is selected from the group consisting of polyolefins, polyamides, polyesters, polystyrene, metal, paper, cardboard and combinations thereof.

13. The method of claim 11, wherein said macromolecularly self-assembling material comprises self-assembling units comprising multiple hydrogen bonding arrays.

14. The method of claim 13, wherein said multiple hydrogen bonding arrays have an association constant K(assoc) of greater than $10^3$ $M^{-1}$.

15. The method of claim 13, wherein said multiple hydrogen bonding arrays comprise at least 4 donor-acceptor hydrogen bonding sites per self-assembling unit.

16. The method of claim 13, wherein said multiple hydrogen bonding arrays comprise an average of 2 to 8 donor-acceptor hydrogen bonding sites per self-assembling unit.

17. The method of claim 1, wherein said macromolecularly self-assembling material comprises repeat units of formula I:

Formula I
$$-\!\!\!\left[O-R-O-\overset{\overset{O}{\|}}{C}-R^1-\overset{\overset{O}{\|}}{C}\right]_w\!\!\!-;$$

and at least one second repeat unit selected from the ester-amide units of Formula II and III:

Formula II
$$-\!\!\!\left[O-R^2-\overset{\overset{O}{\|}}{C}-R^N-\overset{\overset{O}{\|}}{C}-R^2-O-\overset{\overset{O}{\|}}{C}-R^1-\overset{\overset{O}{\|}}{C}\right]_x\!\!\!-;$$

Formula III
$$-\!\!\!\left[O-R-O-\overset{\overset{O}{\|}}{C}-R^1-\overset{\overset{O}{\|}}{C}\!\!\left[R^N-\overset{\overset{O}{\|}}{C}-R^1-\overset{\overset{O}{\|}}{C}\right]_n\right]_y\!\!\!-;$$

and the ester-urethane units of Formula IV:

Formula IV
$$-\!\!\!\left[O-R^2-O-\overset{\overset{O}{\|}}{C}-R^N-\overset{\overset{O}{\|}}{C}-O-R^2-O-\overset{\overset{O}{\|}}{C}-R^1-\overset{\overset{O}{\|}}{C}\right]_z\!\!\!-;$$

or combinations thereof wherein:

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 15000 grams per mole;

$R^1$ at each occurrence independently is a bond or a $C_1$-$C_{20}$ non-aromatic hydrocarbylene group;

$R^2$ at each occurrence independently is a $C_1$-$C_{20}$ non-aromatic hydrocarbylene group;

$R^N$ is —N($R^3$)—Ra—N($R^3$)—, where $R^3$ at each occurrence independently is H or a $C_1$-$C_6$ alkylene and Ra is a $C_2$-$C_{20}$ non-aromatic hydrocarbylene group, or $R^N$ is a $C_2$-$C_{20}$ heterocycloalkyl group containing the two nitrogen atoms, wherein each nitrogen atom is bonded to a carbonyl group according to formula (III) above;

n is at least 1 and has a mean value less than 2; and w represents the ester mol fraction of Formula I, and x, y and z represent the amide or urethane mole fractions of Formulas II, III, and IV, respectively, where w+x+y+z=1, and 0<w<1, and at least one of x, y and z is greater than zero but less than 1.

18. The method of claim 1, wherein said macromolecularly self assembling polymeric material is a polymer or oligomer of Formula II or III:

Formula II
$$-\!\!\!\left[O-R^2-\overset{\overset{O}{\|}}{C}-R^N-\overset{\overset{O}{\|}}{C}-R^2-O-\overset{\overset{O}{\|}}{C}-R^1-\overset{\overset{O}{\|}}{C}\right]_x\!\!\!-;$$

Formula III
$$-\!\!\!\left[O-R-O-\overset{\overset{O}{\|}}{C}-R^1-\overset{\overset{O}{\|}}{C}\!\!\left[R^N-\overset{\overset{O}{\|}}{C}-R^1-\overset{\overset{O}{\|}}{C}\right]_n\right]_y\!\!\!-;$$

wherein

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 15000 grams per mole;

$R^1$ at each occurrence independently is a bond or a $C_1$-$C_{20}$ non-aromatic hydrocarbylene group;

$R^2$ at each occurrence independently is a $C_1$-$C_{20}$ non-aromatic hydrocarbylene group;

$R^N$ is —N($R^3$)—Ra—N($R^3$)—, where $R^3$ at each occurrence independently is H or a $C_1$-$C_6$ alkylene and Ra is a $C_2$-$C_{20}$ non-aromatic hydrocarbylene group, or $R^N$ is a $C_2$-$C_{20}$ heterocycloalkyl group containing two nitrogen atoms, wherein each nitrogen atom is bonded to a carbonyl group according to formula (III) above;

n is at least 1 and has a mean value less than 2; and x and y represent mole fraction wherein x+y =1 , and 0<x<1, and 0<y<1.

19. The method of claim 10, wherein the number average molecular weight ($M_n$) of said macromolecularly self-assembling material is between about 1000 grams per mole (g/mol) and about 100,000 g/mol.

20. The method of claim 16, wherein said $M_n$ of said-macromolecularly self-assembling material is less than 5,000 g/mol.

* * * * *